United States Patent [19]

Peters et al.

[11] 4,310,286
[45] Jan. 12, 1982

[54] ROTOR ASSEMBLY HAVING A MULTISTAGE DISK

[75] Inventors: Gary P. Peters, Lebanon; Robert L. Rowley, Glastonbury; Peter E. Voyer, Tolland, all of Conn.

[73] Assignee: United Technologies Corporation, Hartford, Conn.

[21] Appl. No.: 40,010

[22] Filed: May 17, 1979

[51] Int. Cl.³ .............................................. F01D 5/06
[52] U.S. Cl. ........................... 416/198 A; 416/244 A; 415/199.5
[58] Field of Search .......... 416/198 A, 200 A, 244 A, 416/201 R; 415/199.4, 199.5

[56] References Cited

U.S. PATENT DOCUMENTS

| | | | |
|---|---|---|---|
| 2,356,605 | 8/1944 | Meininghaus | 416/198 A |
| 2,451,944 | 10/1948 | Hall | 416/198 A X |
| 2,461,931 | 2/1949 | Smith et al. | 416/198 A X |
| 2,639,885 | 5/1953 | Ledwith | 416/201 |
| 2,786,625 | 3/1957 | Kent et al. | 416/201 |
| 2,951,677 | 9/1960 | Howald | 416/201 |
| 3,249,293 | 5/1966 | Koff | 416/198 A |
| 3,597,109 | 8/1971 | Petrie et al. | 416/198 A |
| 3,765,795 | 10/1973 | Koff | 416/198 A |
| 3,859,785 | 1/1975 | Leto et al. | 416/198 A X |
| 3,894,324 | 7/1975 | Holzapfel et al. | 416/198 A X |
| 3,903,690 | 9/1975 | Jones | 416/201 X |
| 3,976,399 | 8/1976 | Schmoch | 416/198 A |

FOREIGN PATENT DOCUMENTS

| | | | |
|---|---|---|---|
| 1503634 | 2/1969 | Fed. Rep. of Germany | 416/198 A |
| 885951 | 1/1962 | United Kingdom | 416/198 A |
| 1546783 | 5/1979 | United Kingdom | 416/198 A |
| 248893 | 1/1970 | U.S.S.R. | 416/201 R |

*Primary Examiner*—Everette A. Powell, Jr.
*Attorney, Agent, or Firm*—Gene D. Fleischhauer

[57] ABSTRACT

A lightweight, rotor assembly for a gas turbine engine having a critical speed characteristic well above the operating speed is disclosed. Various construction details which enhance the axial stiffness of the rotor assembly and which shield a portion of the disk from working medium gases are developed. The rotor assembly employs a frustoconical member to connect a shaft to the disk.

8 Claims, 4 Drawing Figures

ROTOR ASSEMBLY HAVING A MULTISTAGE DISK

BACKGROUND OF THE INVENTION

1. Field of the Invention

This invention relates to gas turbine engines and more particularly to the rotor assemblies of such engines.

2. Description of the Prior Art

A gas turbine engine has a fan section, a compressor section, a combustion section and a turbine section. A rotor assembly having a compressor segment and a turbine segment extends axially through the engine. A shaft connects the turbine segment with the compressor segment. In the compressor segment rows of rotor blades extend outwardly on the assembly. A stator assembly circumscribes the rotor assembly. The stator assembly includes an outer case and rows of stator vanes extending inwardly between axially adjacent rows of rotor blades. Struts extend inwardly from the outer case to support bearing compartments at two or more locations. Each bearing compartment houses a bearing at the axis of the engine for support of the rotor assembly.

The compressor segment has a plurality of axially spaced disks. Each pair of disks is joined in spaced relationship by a spacer disposed therebetween. The spacers and the portions of each disk between the spacers form the rotor backbone of the engine. In an alternate rotor construction a wing member integral with one disk functionally replaces the adjacent spacer in forming the rotor backbone. The rotor backbone is designed to be concentric with the axis of the engine.

Rotor loads and gyroscopic maneuver loads during operation are known to cause the rotor to deflect from the intended concentric position. The deflection is directly proportional to the weight of the rotor assembly and the distance between bearing supports. Some engine designers have attempted to decrease deflections by shortening the distance between bearing supports. For example, in structures of the type respresented by U.S. Pat. No. 2,869,820 to Marchant et al. entitled "Rotors for Axial Flow Compressors or Turbines", the unsupported length of the compressor segment is reduced by housing one of the bearings within the blade-carrying length of a rotor. Others have attempted to reduce rotor weight.

As the rotor deflects, the axis of rotation and the center of mass of the rotor no longer coincide and an eccentricity of mass E about the centerline occurs. The eccentricity of mass E results in an outwardly directed force which increases as the speed of rotation of the rotor assembly increases. The outwardly directed force tends to bend the rotor assembly. At a certain speed, commonly called the critical speed, the unbalanced outwardly directed force neutralizes the elastic forces of the rotor which resist deflection. At the critical speed, rotor deflection increases with no further increase in speed. The tips of the rotor blades rub against the outer case causing considerable damage. Accordingly, the rotors of the gas turbine engines are typically designed to have critical speed characteristics well above the operational speeds of the rotors.

Scientists and engineers are continuing to search for structures for lightweight rotor assemblies having a critical speed characteristic well above the operational speed of the rotor assemblies.

SUMMARY OF THE INVENTION

A primary object of the present invention is to provide a rotary assembly having a critical speed characteristic well above the operational speed of the rotor assembly. A lightweight rotor assembly with good axial stiffness is sought. A further object is to reduce thermal and bending stresses within a disk in order to enable the disk to carry greater blade loads.

According to the present invention, a tandem disk and a frustoconical member extending from the rim of the disk combine in a rotor assembly to form structure having a critical speed characteristic well above the intended operating speed.

A primary feature of the present invention is the tandem disk. The disk has a bore, a web, a rim and two rows of blades extending outwardly from the rim. A frustoconical member extends inwardly from the rim to shield the bore and the web from high pressure, high temperature gases. A wing extends from the rim of the disk.

A principal advantage of the present invention is the critical speed characteristic of the rotor assembly. A critical speed characteristic well above the intended operating speed is provided by a rotor assembly having good axial stiffness and low weight. The thrust-to-weight characteristic of the engine is improved by the low weight of the rotor assembly.

The foregoing, and other objects, features and advantages of the present invention will become more apparent in the light of the following detailed description of the preferred embodiment thereof as shown in the accompanying drawing.

DESCRIPTION OF THE PREFERRED EMBODIMENT

Figure 1:
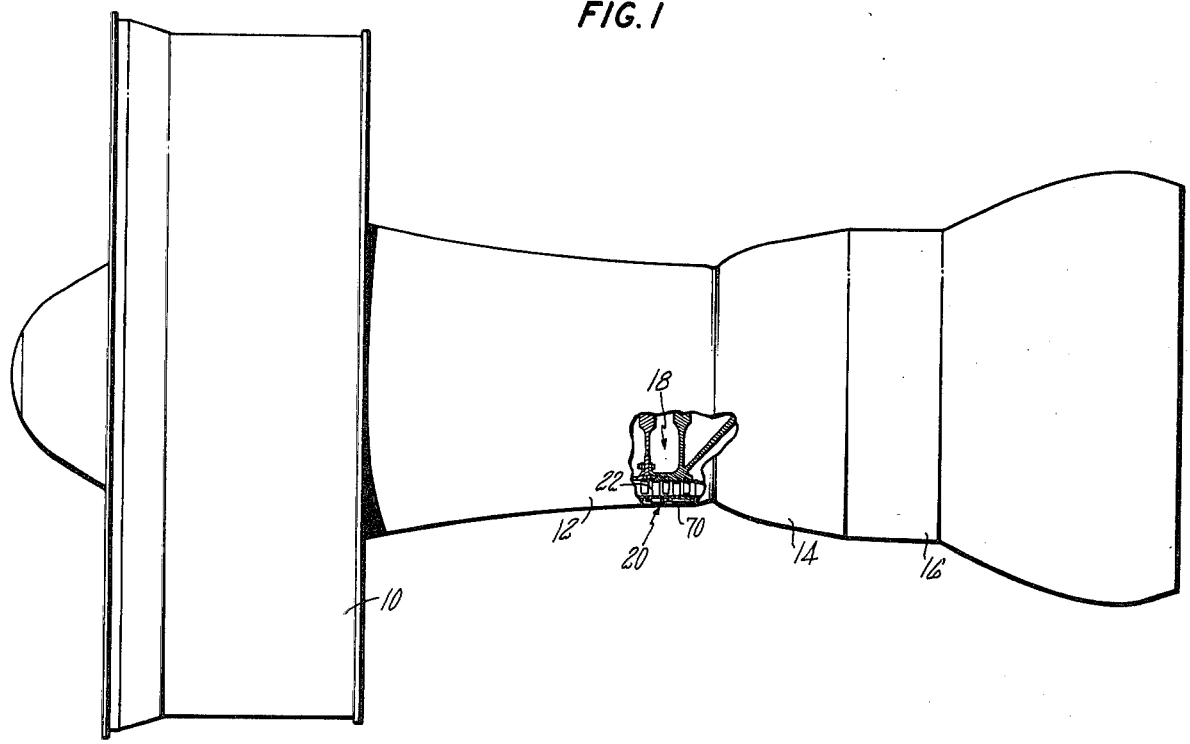
FIG. 1 is a simplified, side elevation view of a turbofan engine with a portion of a compressor section case broken away to reveal portions of the rotor and stator assemblies.

A turbofan gas turbine engine embodiment of the invention is illustrated in FIG. 1. Principal sections of the engine include a fan section 10, a compressor section 12, a combustion section 14 and a turbine section 16. A rotor assembly 18 extends axially through the compressor section and the turbine section. A stator assembly 20 circumscribes the rotor assembly. An annular flow path 22 for working medium gases extends through the compressor section between the rotor assembly and the stator assembly.

Figure 2:
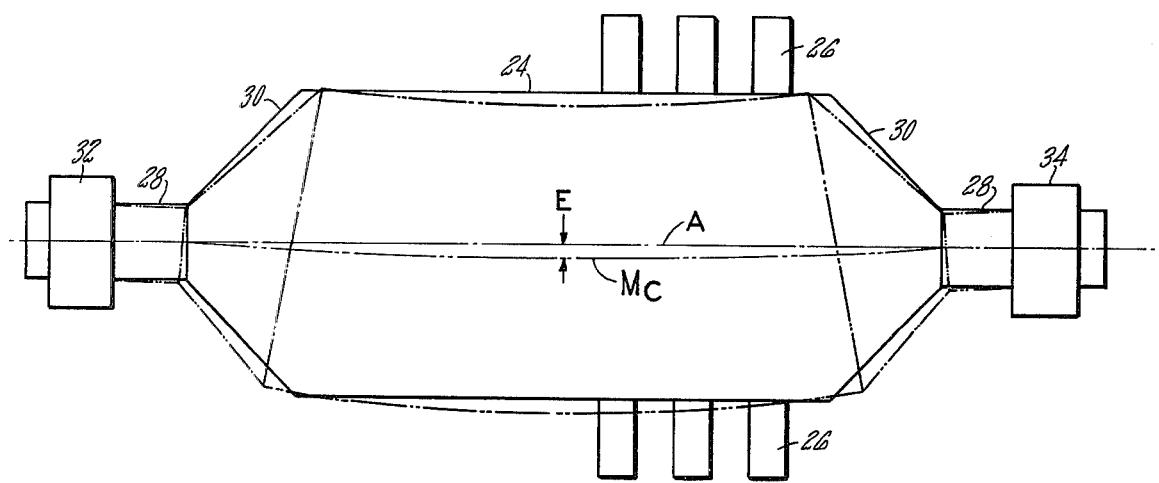
FIG. 2 is a diagrammatic view of a portion of a rotor assembly illustrating deflection and eccentricity E of mass resulting from the weight of the rotor assembly.

FIG. 2 is a diagrammatic illustration of a portion of the rotor assembly 18 in the compressor section 12 under bending loads. The rotor assembly has a front end, a rear end and includes rotating components such as a rotor backbone 24 and rows of blades as represented by the single blades 26 extending outwardly from the rotor backbone. The rotor assembly includes a shaft 28 and a frustoconial member 30 extending between the shaft and the rotor backbone. An upstream bearing support 32 and a downstream bearing support 34 engage the shaft of the rotor assembly. The rotor assembly has an axis of rotation A. The dotted lines show the deflection of the stationary rotor assembly resulting from the weight of the rotor assembly. The center of mass of the rotor assembly is shown by the line $M_c$. The eccentricity E of the center of mass at the midpoint of the rotor is shown.

Figure 3:
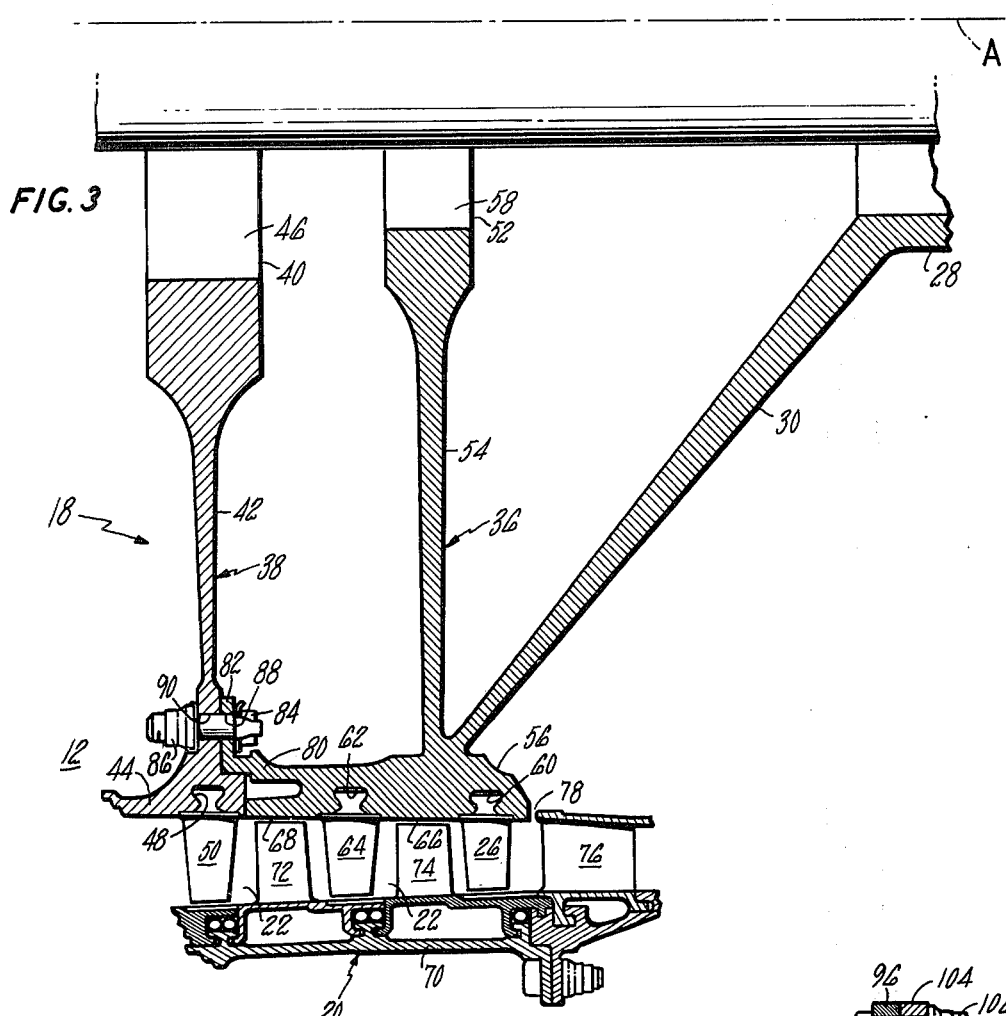
FIG. 3 is an enlarged view of portions of the rotor stator assemblies shown in FIG. 1.

FIG. 3 illustrates the rear portion of the rotor assembly 18 in the rear of the compressor section 12. The rotor assembly includes an endmost rotor disk such as a tandem disk 36 and an adjacent upstream disk 38. The upstream disk has a bore 40, a web 42, and a circumferentially extending rim 44. The bore has a cylindrical opening 46. The rim has a slot 48 which extends circumferentially about the rim. A row of upstream rotor blades, as represented by the single rotor blade 50, are adapted to engage the slot. The downstream disk has a bore 52, a web 54 and a rim 56. The bore has a cylindrical opening 58. The rim has a circumferentially extending first slot 60 and a circumferentially extending second slot 62. The first row of rotor blades, as represented by the single rotor blades 26, is adapted to engage the first slot 60 in the tandem disk 36. A second row of rotor blades, as represented by the single rotor blade 64, is adapted to engage the second slot 62. The second slot is spaced axially from the first slot leaving a first disk surface 66 therebetween. The second slot is also axially spaced from the slot 48 in the upstream disk 38 leaving a second disk surface 68 on the downstream disk therebetween.

The stator assembly 20 includes an outer case 70. A row of upstream stator vanes, as represented by the upstream stator vane 72, exends inwardly from the case into proximity with the second disk surface 68. A downstream row of stator vanes, as represented by the stator vane 74, extends inwardly from the outer case into proximity with the first disk surface 66. A row of vanes, as represented by the single vane 76, extends inwardly from the outer case and is spaced axially from the rotor assembly leaving a gap 78 therebetween.

The tandem disk 36 is joined to the shaft 28 by the frustoconical member 30. The frustoconical member is integrally formed with the shaft and the disk and adjoins the rim 56 of the downstream disk. The tandem disk is joined to the upstream disk by a circumferentially extending wing 80. The wing has a flange 82. The wing is affixed to the upstream disk by a plurality of nuts and bolts as represented by the single bolt 84 and the nut 86. Each bolt passes through a corresponding hole 88 in the flange of the wing and a corresponding hole 90 in the rim of the upstream disk.

Figure 4:
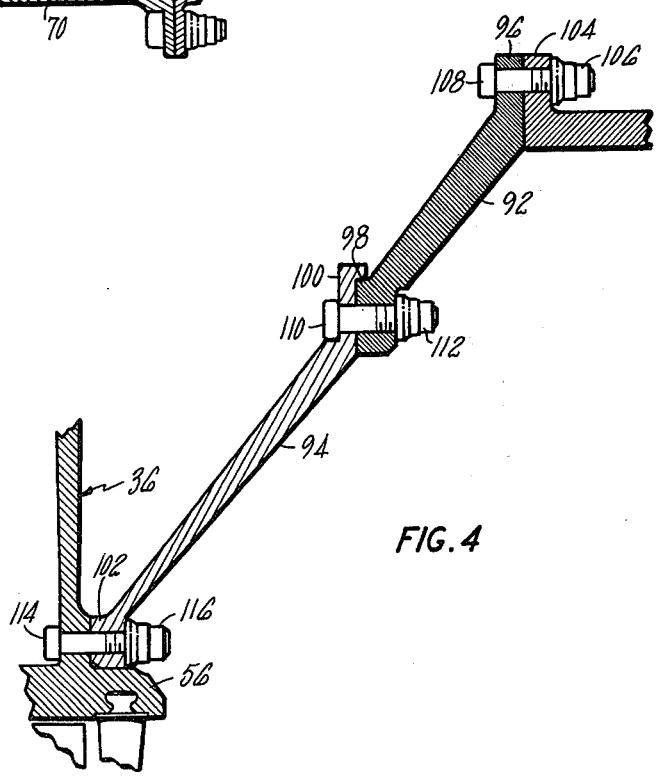
FIG. 4 is a sectional view corresponding to a portion of the FIG. 2 view and shows an alternate embodiment.

FIG. 4 shows an alternate embodiment of the invention having another configuration for joining the downstream disk to the shaft through a frustoconical member.

The frustoconical member 30 has an inner portion 92 and an outer portion 94. The inner portion has an inner flange 96 and an outer flange 98. The outer portion has an inner flange 100 and an outer flange 102. The shaft 28 has a flange 104 which is mechanically joined to the inner portion of the frustoconical member by a joining means such as a plurality of nuts and bolts as represented by the single nut 106 and the bolt 108. The inner portion is joined to the outer portion of the frustoconical member by a joining means such as a plurality of nuts and bolts as represented by the single bolt 110 and the nut 112. The outer portion of the frustoconical member extends outwardly to adjoin the rim 56 of the tandem disk 36. The outer portion of the frustoconical member is mechanically joined to the tandem disk by a means such as a plurality of nuts and bolts as represented by the single bolt 114 and the nut 116.

Each bolted joint increases the ease of fabrication and maintenance of the rotor assembly. Because each bolted connection introduces a small, classical, flat plate-type structure, a decrease in the number of bolted connections results in an increase in the axial stiffness of a given rotor assembly.

During operation of the gas turbine engine, air is compressed by the fan section 10 and the compressor section 12 to form a high pressure, high temperature working medium. The working medium flows out of the compressor section into the combustion section 14. In the combustion section, fuel is burned with the working medium to add energy to the medium. Both the compression process and the combustion process cause the temperature of the working medium to increase dramatically.

The hot working medium loses heat by convection and radiation to engine components. The rate of loss is directly proportional to the temperature of the working medium. At the rear stages of the compressor section 12 such as near the tandem disk 36, the temperature of the working medium may approach five-hundred degrees Centigrade (500° C.) and the pressure may approach three-hundred pounds per square inch absolute (300 PSIA) or approximately two meganewtons per square meter ($2 \times 10^6$ N/M$^2$). A portion of the working medium at this high pressure leaks through the gap 78 between the rim 56 of the tandem disk and the row of vanes 76. The high pressure medium is prevented from contacting the web 54 of the tandem disk by the frustoconical member 30 which joins the disk near the rim 56. Use of the frustoconical member avoids the undesirable bending stresses resulting from the pressure load of the working medium on the web. The web is a classical, flat plate structure and is vulnerable to such axial loads. The frustoconical member also avoids the development of large temperature gradients in the disk by blocking the transfer of heat directly from the high temperature gases to the web. Were the high temperature gases to contact the web and bore of the disk, large thermal gradients causing thermal stresses would result. Such a problem is exacerbated by the cooling air passing through the opening 58 in the bore of the disk. The moderation of thermal stresses and the prevention of gas induced bending stresses lowers the total stress far enough below the fatigue strength of the disk to enable the disk to withstand additional mechanical stresses and still have a satisfactory low cycle fatigue life.

The concepts of the present invention take advantage of the ability of the tandem disk 36 to withstand additional mechanical stresses by adding the second row of blades to the tandem disk. The predominant portion of the mechanical loads resulting from the second row 64 of rotor blades is carried by the disk 36. In some embodiments, particularly those adapted for military applications, the remaining mechanical loads are carried by the upstream disk 38 and the frustoconical member 30. In the present invention, the tandem disk does not need an increase in weight to carry the mechanical loads from the second row of blades nor is a separate upstream disk required. Accordingly, the rotor assembly of the present invention weighs less than conventional rotor assemblies and has a correspondingly improved critical speed characteristic.

As the hot gasses leave the combustion section 14 and flow through the turbine section 16, energy from the hot gases is imparted to the rotor assembly 18. The rotor assembly transmits rotational energy at a speed of 13,000 revolutions per minute from the turbine section to the compressor section, through the shaft 28 and the frustoconical member 30. The frustoconical member joins the tandem disk 36 of the compressor section near the rim 56. Joining the frustoconical member to the disk near the rim avoids the classical, flat plate-type structure found between the frustoconical member and the rim of the disk of conventional turbine engines. Avoiding the inherent axial flexibility of a flat plate-type structure increases the rotor critical speed characteristic associated with such a structure.

In summary, the combined frustoconical member and tandem disk enable construction of a rotor assembly 18 having a critical speed characteristic well above the operational speed of the rotor assembly in two ways: (1) by reducing the weight of the rotor assembly as compared with conventional rotor assemblies, and (2) by providing an axially stiff connection between the compressor section portion of the rotor assembly and the shaft of the rotor assembly.

Those skilled in the art will realize that by adjusting the weight of the rotor assembly and the stiffness of the axially stiff connection, the critical speeds of the rotor assembly may be finely tuned. In such a rotor assembly, the operational speed may be between two critical speeds or well above the first critical speed of the rotor assembly.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. For a gas turbine engine having an axially extending flowpath for working medium gases, a rotor assembly of the type having a front end, a rear end and at least two rows of circumferentially spaced rotor blades extending outwardly from the rotor assembly across the flowpath, the improvement comprising:
   a rotor shaft;
   an endmost rotor disk having a bore, a web and a rim including a first slot at the rim which is adapted to receive a first row of rotor blades and a second slot at the rim which is adapted to receive a second row of rotor blades; and
   a frustoconical member extending outwardly from said rotor shaft to the rim of said rotor disk thereby shielding the bore and the web of said rotor disk from the working medium gases of the engine flowpath.

2. The invention according to claim 1 wherein the frustoconical member is integrally formed with the shaft and the rotor disk.

3. The invention according to claim 1 wherein the frustoconical member has a first portion which extends outwardly from the shaft and a second portion extends inwardly from the disk, said first and second portions being mechanically joined between the rim of the disk and the shaft.

4. The invention according to claim 1 wherein the frustoconical member is mechanically joined to the disk.

5. The invention according to claims 1 or 4 wherein the frustoconical member is mechanically joined to the shaft.

6. The invention according to claim 3 wherein the first portion of the frustoconical member has an outer end and an inner end wherein the outer end is mechanically joined to the second portion of the frustoconical member and the inner end is mechanically joined to the shaft.

7. The invention according to claim 1 which further includes an adjacent rotor disk which is mechanically attached to the rim of said rotor disk wherein the adjacent rotor disk has a rim and a slot at the rim which is adapted to receive a third row of rotor blades.

8. The invention according to claim 7 wherein said rotor disk having two arrays of blades has a circumferentially extending wing at the rim thereof which is mechanically joined to said adjacent rotor disk and adjoins the rim of the adjacent disk and wherein said rotor disk having two rows of rotor blades has a second disk surface spaced outwardly from said wing which extends between the second slot in said disk and the third slot in said adjacent rotor disk for shielding the wing and for shielding the location of mechanical attachment between the wing and the disk from the hot working medium gases.

* * * * *